United States Patent Office 3,170,920
Patented Feb. 23, 1965

3,170,920
3-OXO-16β - MERCAPTO - 17β - HYDROXY - 5α - ANDROSTANE-16-17 ACETONIDES AND THE PROCESS FOR THE PRODUCTION THEREOF
Taichiro Komeno, Sumiyoshi-ku, Osaka-shi, Japan, assignor to Shionogi & Co., Ltd., Osaka, Japan
No Drawing. Filed Aug. 10, 1962, Ser. No. 216,059
23 Claims. (Cl. 260—239.55)

The present invention relates to steroidal cyclic acetals, and more particularly to a process for preparing 3-oxo-16β-mercapto-17β-hydroxy-4-androstene 16,17-cyclic acetals and intermediates therefor.

The 3-oxo-16β-mercapto-17β-hydroxy - 4 - androstene 16,17-cyclic acetals correspond to the formula:

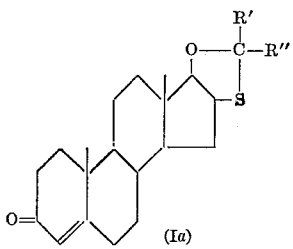

wherein R' is hydrogen, lower alkyl (e.g. methyl, ethyl, propyl, butyl), phenyl, lower alkylphenyl (e.g. tolyl, xylyl) or phenyl(lower)alkyl (e.g. benzyl, phenethyl), R" is lower alkyl (e.g. methyl, ethyl, propyl, butyl), phenyl, lower alkylphenyl (e.g. tolyl, xylyl) or phenyl(lower) alkyl (e.g. benzyl, phenethyl) and, when linked together, R' and R" represent cyclic lower alkyl (e.g. cyclopentyl, cyclohexyl).

The said Δ⁴-3-oxo cyclic acetal Ia per se has been disclosed and claimed in the copending application of K. Takeda and T. Komeno, Ser. No. 187,462, now Pat. No. 3,112,306, filed April 12, 1962, and are useful as antigonadotropic agents.

Accordingly, a primary object of the present invention is to provide a novel process for preparing the said Δ⁴-3-oxo cyclic acetal Ia. Another object is to provide intermediates which can be readily converted into the Δ⁴-3-oxo cyclic acetal Ia according to a per se conventional procedure. These and other objects will be apparent to those conversant with the art to which the present invention pertains from the subsequent description.

The process of the present invention can be generically represented by the formulae:

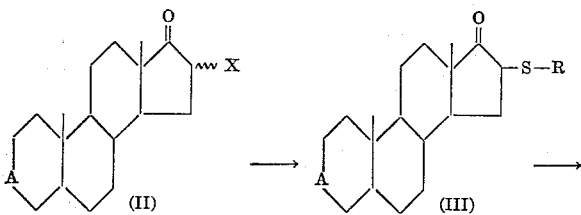

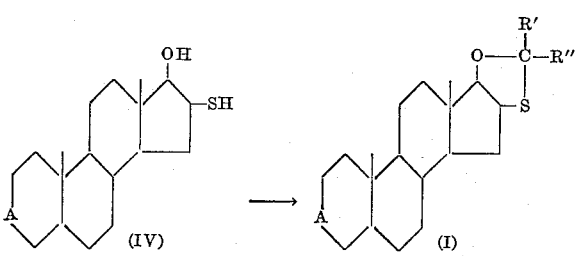

wherein A represents α-hydroxymethylene, β-hydroxymethylene or carbonyl; X represents halogen (e.g. chlorine, bromine, iodine); R represents lower alkanoyl (e.g. acetyl, propionyl, butyroyl) or lower alkoxythiocarbonyl (e.g. methoxythiocarbonyl, ethoxythiocarbonyl, propoxythiocarbonyl); R' and R" each have the same significance as designated above; a double bond can be present between 4- and 5-positions or 5- and 6-positions; the hydrogen atom at 5-position, when the said double bond is not present, has α- or β-configuration; and the ripple mark (⸾) represents α- or β-configuration. In this connection, it should be understood that the foregoing formulae show the substantial order of the steps in the production, modifications and equivalents—including possible detours—being omitted. Thus, any hydroxyl and/or oxo radicals, except the oxo and hydroxyl radicals at 17-position, in the disclosed compounds are intended also to represent such radicals as properly protected. In other words, the showing of a hydroxyl radical is intended to represent a free hydroxyl or a protected hydroxyl such as acylated hydroxyl, and the showing of an oxo radical is intended to represent a free oxo or a protected oxo such as ketalized oxo. Still more, it should be also understood that the double bond between 4- and 5-positions, if it is present, may be removed to the position between 5- and 6-positions, when the oxo radical at 3-position is protected.

The starting materials of the present invention are 16-halogeno-17-oxoandrostanes, corresponding to Formula II, and may be fundamentally exampled as follows:

3α-hydroxy-16α-chloro-17-oxo-5β-androstane,
3α-hydroxy-16α-bromo-17-oxo-5β-androstane,
3β-hydroxy-16α-bromo-17-oxo-5α-androstane,
3α-hydroxy-16β-bromo-17-oxo-5β-androstane,
3β-hydroxy-16β-bromo-17-oxo-5α-androstane,
3β-hydroxy-16α-iodo-17-oxo-5α-androstane,
3β-hydroxy-16α-chloro-17-oxo-5(6)-androstene,
3α-hydroxy-16α-bromo-17-oxo-5(6)-androstene,
3β-hydroxy-16α-bromo-17-oxo-5(6)-androstene,
3α-hydroxy-16β-bromo-17-oxo-5(6)-androstene,
3β-hydroxy-16β-bromo-17-oxo-5(6)-androstene,
3α-hydroxy-16β-iodo-17-oxo-5(6)-androstene,
3,17-dioxo-16α-chloro-5β-androstane,
3,17-dioxo-16α-bromo-5α-androstane,
3,17-dioxo-16α-bromo-5β-androstane,
3,17-dioxo-16β-bromo-5α-androstane,
3,17-dioxo-16β-bromo-5β-androstane,
3,17-dioxo-16α-chloro-4-androstene,
3,17-dioxo-16α-bromo-4-androstene,
3,17-dioxo-16β-bromo-4-androstene, etc.

Hereupon, the free oxo radical at 3-position is apt to be undesirably affected by the reagent employed in the process of the present invention. Accordingly, the said free oxo radical is desired to be previously protected. On the contrary, the protection of the free hydroxyl radical at 3-position is unnecessary. However, the acylated compound may be produced more easily than the corresponding free hydroxyl compound. In such case, the acylated compound may be subjected to the process of the present invention as it is. Thus, the following 16-halogeno-17-oxo-androstanes may be practically used:

3α-acetoxy-16α-chloro-17-oxo-5β-androstane,
3α-acetoxy-16α-bromo-17-oxo-5β-androstane,
3α-propoxy-16α-bromo-17-oxo-5β-androstane,
3β-acetoxy-16α-bromo-17-oxo-5α-androstane,
3β-butoxy-16α-bromo-17-oxo-5α-androstane,
3α-acetoxy-16β-bromo-17-oxo-5β-androstane,
3β-acetoxy-16β-bromo-17-oxo-5α-androstane,
3β-acetoxy-16α-iodo-17-oxo-5α-androstane,
3β-acetoxy-16α-chloro-17-oxo-5(6)-androstene,
3α-acetoxy-16α-bromo-17-oxo-5(6)-androstene, 3α-propoxy-16α-bromo-17-oxo-5(6)-androstene,
3β-acetoxy-16α-bromo-17-oxo-5(6)-androstene,
3β-propoxy-16α-bromo-17-oxo-5(6)-androstene,
3β-butoxy-16α-bromo-17-oxo-5(6)-androstene,
3α-acetoxy-16β-bromo-17-oxo-5(6)-androstene,
3β-acetoxy-16β-bromo-17-oxo-5(6)-androstene,
3α-acetoxy-16β-iodo-17-oxo-5(6)-androstene,
3,3-ethylenedioxy-16α-chloro-17-oxo-5β-androstane,
3,3-ethylenedioxy-16α-bromo-17-oxo-5α-androstane,
3,3-ethylenedioxy-16α-bromo-17-oxo-5β-androstane,
3,3-ethylenedioxy-16β-bromo-17-oxo-5α-androstane,
3,3-ethylenedioxy-16β-bromo-17-oxo-5β-androstane,
3,3-ethylenedioxy-16α-chloro-17-oxo-5(6)-androstene,
3,3-ethylenedioxy-16α-bromo-17-oxo-5(6)-androstene,
3,3-ethylenedioxy-16β-bromo-17-oxo-5(6)-androstene, etc.

These practically employed starting materials are generically representable by the formula:

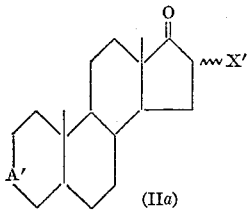

(IIa)

wherein A' represents α-lower alkanoyloxymethylene (e.g. α-acetoxymethylene, α-propionyloxymethylene, α-butyryloxymethylene), β-lower alkanoyloxymethylene (e.g. β-acetoxymethylene, β-propionyloxymethylene, β-butyryloxymethylene) and lower alkylenedioxymethylene (e.g. ethylenedioxymethylene trimethylenedioxymethylene); X' represents halogen (e.g. chlorine, bromine, iodine); a double bond can be present between 4- and 5-positions or 5- and 6-positions; the hydrogen atom at 5-position, when the said double bond is not present, has α- or β-configuration; and the ripple mark ($\xi$) represents α- or β-configuration.

The said 16-halogeno-17-oxoandrostanes II are known compounds and can be prepared according to a conventional method [J. Fried et al.: U.S. Patent Nos. 2,857,403 and 2,831,872; B. Ellis et al.: J. Chem. Soc., 800 (1958); J. Fajkoš et al.: Chemical Abstracts, 53, 4349 (1959)].

The process of the present invention substantially comprises three steps.

Firstly, the 16-halogeno-17-oxoandrostane II is reacted substantially with a sulfur-containing organic acid such as thioalkanoic acid (e.g. thioacetic acid, thiopropionic acid, thiobutyric acid) and alkyldithiocarbonic acid (e.g. methyldithiocarbonic acid, ethyldithiocarbonic acid, propyldithiocarbonic acid). Usually, the reaction is carried out by treating the 16-halogeno-17-oxoandrostane II with an alkali metal salt of the said sulfur-containing organic acid (e.g. sodium thioacetate, potassium thioacetate, potassium thiopropionate, potassium thiobutyrate, potassium methyldithiocarbonate, sodium ethyldithiocarbonate, potassium ethyldithiocarbonate, sodium propyldithiocarbonate, potassium propyldithiocarbonate) in a suitable medium (e.g. acetone, ether, dioxane, tetrahydrofuran) at room temperature for several hours.

Secondly, the resultant 16-substituted thioandrostane III is reduced with an alkali metal hydride (e.g. lithium aluminum hydride, lithium borohydride, sodium borohydride). The reaction is usually carried out by treating the 16-substituted thioandrostane III with the said reducing agent in a suitable medium (e.g. ether, dioxane, tetrahydrofuran, benzene), if necessary, while heating.

Thirdly, the resulting 16-mercaptoandrostane IV is condensed with a carbonyl compound such as aldehydes and ketones (e.g. acetaldehyde, propionaldehyde, butyraldehyde, benzaldehyde, acetone, methyl ethyl ketone, diethyl ketone, methyl butyl ketone, dipropyl ketone, dibutyl ketone, cyclohexanone, benzophenone) in the presence of an acidic catalyst (e.g. p-toluenesulfonic acid, sulfuric acid).

Although the method of this invention is hereinbefore illustrated step by step, these steps may be executed successively without the isolation of the product in each step, especially in the case that the prepared intermediate is not stable. For instance, the 16-mercaptoandrostane IV is relatively unstable and preferred to be subjected to the reaction in the subsequent step without its isolation from the reaction mixture.

The final products of the present invention are the cyclic acetal I, which can be specifically exampled as follows:

3β,17β-dihydroxy-16β-mercapto-5(6)-androstene 16,17-acetonide,
3β-acetoxy-16β-mercapto-17β-hydroxy-5(6)-androstene 16,17-acetonide,
3β-propoxy-16β-mercapto-17β-hydroxy-5(6)-androstene 16,17-acetonide,
3β,17β-dihydroxy-16β-mercapto-5(6)-androstene diethyl ketone 16,17-cyclic acetal,
3α,17β-dihydroxy-16β-mercapto-5(6)-androstene 16,17-acetonide,
3α-acetoxy-16β-mercapto-17β-hydroxy-5(6)-androstene benzaldehyde 16,17-cyclic acetal,
3β,17β-dihydroxy-16β-mercapto-5α-androstane 16,17-acetonide,
3α-butoxy-16β-mercapto-17β-hydroxy-5β-androstane cyclohexanone 16,17-cyclc acetal,
3-oxo-16β-mercapto-17β-hydroxy-4-androstene 16,17-acetonide,
3-oxo-16β-mercapto-17β-hydroxy-4-androstene diethylketone 16,17-cyclic acetal,
3-oxo-16β-mercapto-17β-hydroxy-4-androstene benzaldehyde 16,17-cyclic acetal,
3-oxo-16β-mercapto-17β-hydroxy-4-androstene cyclohexanone 16,17-cyclic acetal,
3,3-ethylenedioxy-16β-mercapto-17β-hydroxy-5(6)-androstene 16,17-acetonide,
3,3-ethylenedioxy-16β-mercapto-17β-hydroxy-5(6)-androstene diethylketone 16,17-cyclic acetal,
3,3-ethylenedioxy-16β-mercapto-17β-hydroxy-5α-androstane 16,17-acetonide,
3-oxo-16β-mercapto-17β-hydroxy-5α-androstane 16,17-acetonide, etc.

Of these compounds the Δ⁴-3-oxo cyclic acetals Ia are useful as antigonadotropic agents. When orally administered to mice (bodyweight, 15 to 17 grams; 40 days old) at the dose of 1 milligram, 3-oxo-16β-mercapto-17β-hydroxy-4-androstene 16,17-acetonide, for instance, showed an antigonadotropic activity with the inhibiting ratio of 81.82 percent approximately equal to that of the heretofore known antigonadotropic steroid, 17α-ethinyl-19-nortestosterone. The other Δ⁴-3-oxo cylic acetals Ia also have the similar activities. The cyclic acetals I which are not included in the Δ⁴-3-oxo cyclic acetals Ia can be readily converted into the cyclic acetals I in a conventional manner.

The following examples set forth illustratively presently-preferred embodiments of the invention.

In the examples, the abbreviations have the following significances: mg., milligram(s); g., gram(s); ml., millilitre(s); Anal. Calcd., analysis calculated; and ° C., degrees centigrade. Other abbreviations have conventional significances.

Example 1

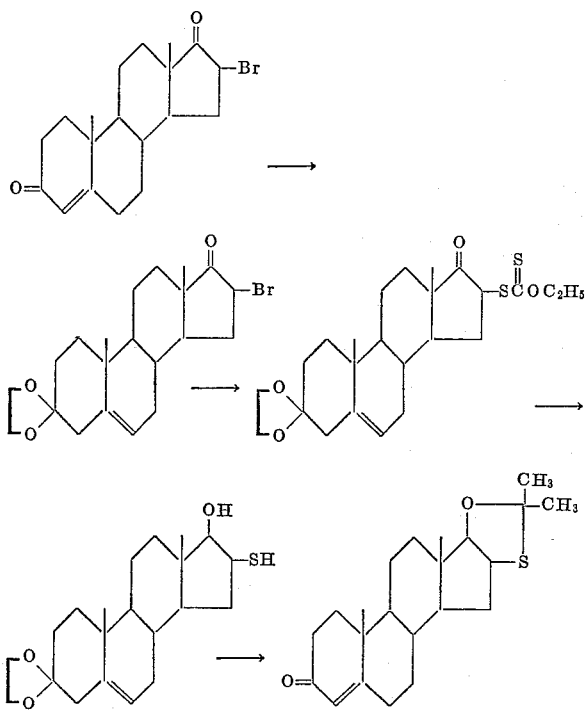

(a) *Preparation of 3,3-ethylenedioxy-16β-bromo-17-oxo-5(6)-androstene.*—3,17-dioxo-16β-bromo - 4 - andro - stene [J. Fajkoš et al.: Chemical Abstracts, 53, 4349 (1959)] (9.03 g.) is combined with anhydrous benzene (200 ml.), ethylene glycol (15 ml.) and p-toluenesulfonic acid (450 mg.), and the resultant solution is refluxed for 16 hours. After cooling, the reaction mixture is neutralized with aqueous sodium carbonate and shaken with benzene. The benzene layer is washed with water and the solvent is removed under a reduced pressure. The residue is crystallized from ether and recrystallized from dichloromethane-acetone to give 3,3-ethylenedioxy-16β-bromo-17-oxo-5(6)-androstene (6.83 g.) as crystals melting at 204 to 206° C.

*Analysis.*—Calcd. for $C_{21}H_{29}O_3Br$: C, 61.61; H. 7.14; Br, 19.52. Found: C, 61.79; H, 7.24; Br, 19.75

(b) *Preparation of 3,3-ethylenedioxy-16β-ethoxythiocarbonylthio-17-oxo-5(6)androstene.*—To a suspension of 3,3-ethylenedioxy-16β-bromo-17 - oxo - 5(6) - androstene (917 mg.) in acetone (20 ml.), there is added potassium ethyldithiocarbonate (595 mg.), and the resultant solution is stirred for 5 hours at a room temperature. Adding water to the reaction mixture, the resulting mixture is extracted with benzene-ether (1:1). The extract is washed with water and dried. Removing the solvent, the residue (1.077 g.) is dissolved in a small amount of benzene and chromatographed on alumina (25 g.). The eluate (904 mg.) is crystallized from methanol and recrystallized from chloroform-ethanol to give 3,3-ethylenedioxy-16β-ethoxythiocarbonylthio-17-oxo - 5(6) - androstene (644 mg.) as needles melting at 208 to 210° C. (decomp.).

$[α]_D^{19°} + 1.3 ± 2°$ (c.=1.078 chloroform)

*Analysis.*—Calcd. for $C_{24}H_{34}O_4S_2$: C, 63.96; H, 7.61; S, 14.23. Found: C, 63.64; H, 7.63; S, 14.11.

(c) *Preparation of 3,3 - ethylenedioxy-16β-mercapto-17β-hydroxy-5(6)-androstene.*—A solution of 3,3-ethylenedioxy - 16β - ethoxythiocarbonylthio-17-oxo-5(6)-androstene (480 mg.) in a mixture of tetrahydrofuran (60 ml.) and anhydrous ether (20 ml.) is added dropwise to a suspension of lithium aluminum hydride (200 mg.) in ether (20 ml.) and stirred for 3 hours while refluxing. Adding ice-water to the reaction mixture, the organic solvent layer is washed with 10% hydrochloric acid, water, 10% sodium carbonate and water in order and dried. Removing the solvent, the residue (406 mg.) is washed with ether to give 3,3-ethylenedioxy-16β-mercapto-17β-hydroxy-5(6)-androstene (300 mg.) as crude crystals melting at 207 to 211° C.

(d) *Preparation of 3-oxo-16β-mercapto-17β-hydroxy-4 - androstene 16,17-acetonide.*—3,3-ethylenedioxy-16β-mercapto-17β-hydroxy-5(6)-androstene (100 mg.) is refluxed with p-toluenesulfonic acid (10 mg.) in acetone (5 ml.) for 5 hours. To the reaction mixture, there is added water, and the precipitated crystals are collected by filtration. The crystals are dissolved in benzene-petroleum ether (1:1) and chromatographed on alumina (3 g.). The eluated substance is crystallized from acetone-methanol to give 3-oxo-16β-mercapto-17β-hydroxy-4-androstene 16,17-acetonide (80 mg.) as scales melting at 228 to 230° C.

*Analysis.*—Calcd. for $C_{22}H_{32}O_2S$: C, 73.29; H, 8.95; S, 8.89. Found: C, 73.52; H, 9.18; S, 8.71.

Example 2

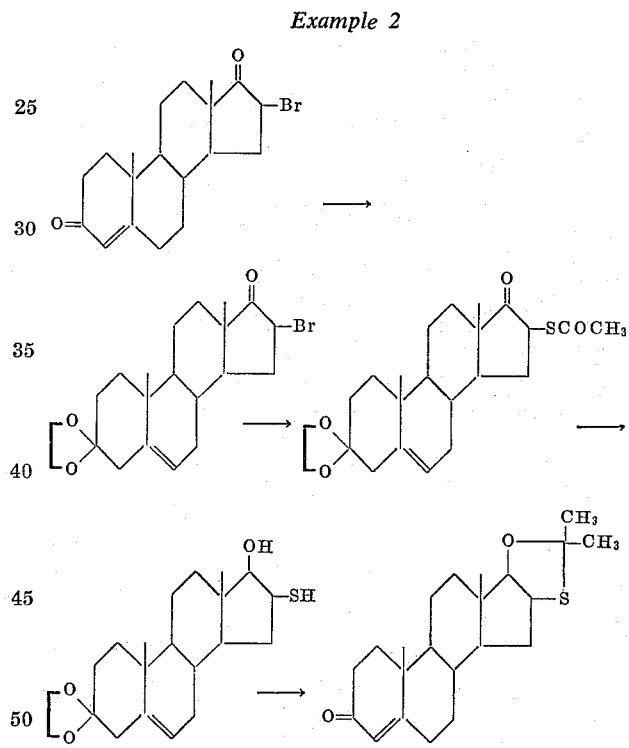

(a) *Preparation of 3,3-ethylenedioxy-16β-bromo-17-oxo - 5(6) - androstene.*—3,17-dioxo-16β-bromo-4-androstene is subjected to ketalation as in Example 1(a) to give 3,3-ethylenedioxy-16β-bromo-17-oxo-5(6)-androstene.

(b) *Preparation of 3,3-ethylenedioxy-16β-acetylthio-17-oxo-5(6)-androstene.*—To a suspension of 3,3-ethylenedioxy-16β-bromo-17-oxo-5(6)-androstene (504 mg.) in acetone (20 ml.), there is added potassium thioacetate (282 mg.), and the resultant solution is stirred for 4 hours at room temperature (10 to 25° C.). Adding water to the reaction mixture, the precipitate is collected by filtration, dried and crystallized from methanol to give 3,3-ethylenedioxy - 16β - acetylthio-17-oxo-5(6)-androstene (412 mg.) as needles melting at 172 to 173° C.

$[α]_D^{28°} - 6.8 ± 2°$ (c.=1.078 chloroform)

*Analysis.*—Calcd. for $C_{22}H_{32}O_4S$: C. 68,28; H, 7.97; S, 7.93. Found: C, 68.20; H, 8.03; S, 7.77.

(c) *Preparation of 3,3 - ethylenedioxy-16β-mercapto-17β - hydroxy-5(6)-androstene.*—3,3-ethylenedioxy-16β-acetylthio-17-oxo-5(6)-androstene (352 mg.) is treated with lithium aluminum hydride (150 mg.) as in Example 1(c) to give 3,3 - ethylenedioxy-16β-mercapto-17β-hydroxy-5(6)-androstene (250 mg.).

(d) *Preparation of 3-oxo-16β-mercapto-17β-hydroxy-4 - androstene 16,17-acetonide.*—3,3-ethylenedioxy-16β-mercapto-17β-hydroxy-5(6)-androstene (250 mg.) is condensed with acetone in the presence of p-toluenesulfonic acid as in Example 1(d) to give 3-oxo-16β-mercapto-17β-hydroxy-4-androstene 16,17-acetonide (173 mg.) as crystals melting at 221 to 225° C.

*Example 3*

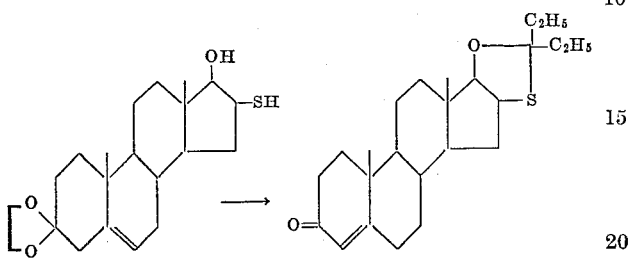

3,3 - ethylenedioxy - 16β-mercapto-17β-hydroxy-5(6)-androstene (3.686 g.) prepared as in Example 1(a), (b) and (c) is refluxed with diethylketone (120 ml.) and p-toluenesulfonic acid (300 mg.) for 13 hours. The reaction mixture is shaken with benzene. The benzene layer is washed with aqueous sodium carbonate and then water, and dried. Removing the solvent, the residue is chromatographed on alumina. The substance eluated with petroleum ether-benzene (1:1, 1:2) is crystallized from petroleum ether and recrystallized from methanol to give 3-oxo - 16β-mercapto-17β-hydroxy-4-androstene diethylketone 16,17-cyclic acetal (1.85 g.) as needles melting at 144 to 146° C.

$[\alpha]_D^{28°} + 40.0° \pm 2°$ (c.=1.043 chloroform)

*Analysis.*—Calcd. for $C_{24}H_{36}O_2S$: C, 74.18; H, 9.34; S, 8.25. Found: C, 74.30; H, 9.34; S, 8.28.

*Example 4*

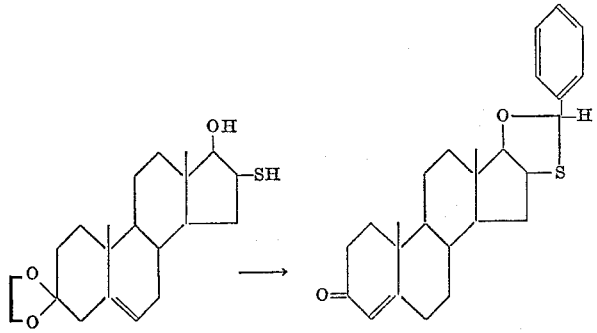

3,3 - ethylenedioxy - 16β - mercapto-17β-hydroxy-5(6)-androstene (2.588 g.) prepared as in Example 1(a), (b) and (c) is refluxed with a mixture of benzene (100 ml.) p-toluenesulfonic acid (120 mg.) and benzaldehyde (8 ml.) for 8 hours. The reaction mixture is shaken with benzene. The benzene layer is washed with aqueous sodium carbonate and then water, and dried. Removing the solvent, the residue is chromatographed on alumina. The substance eluated with petroleum ether-benzene (2:1, 1:1, 1:2) is crystallized from ether and recrystallized from acetone-methanol to give 3-oxo-16β-mercapto-17β-hydroxy-4-androstene benzaldehyde 16,17-cyclic acetal (458 mg.) as needles melting at 171 to 173° C./180° C.

$[\alpha]_D^{25} + 115.2° \pm 2°$ (c.=1.170 chloroform)

*Analysis.*—Calcd. for $C_{26}H_{32}O_2S$: C, 76.43, H, 7.89; S, 7.85. Found: C, 76.48; H, 8.04; S, 8.15.

*Example 5*

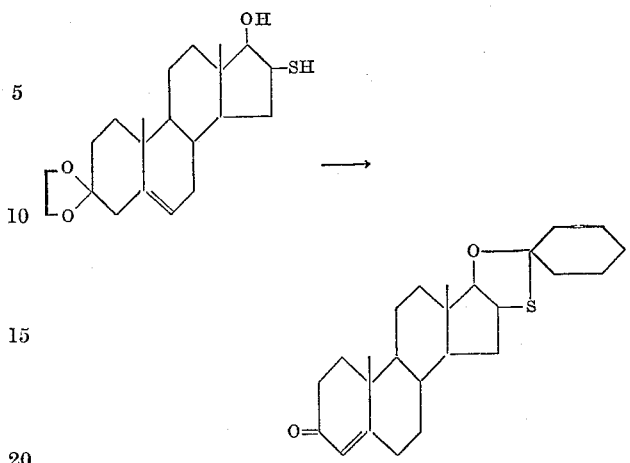

3,3 - ethylenedioxy - 16β-mercapto-17β-hydroxy-5(6)-androstene (720 mg.) prepared as in Example 1(a), (b) and (c) is refluxed with benzene (30 ml.), p-toluenesulfonic acid (70 mg.) and cyclohexanone (1 ml.) for 8 hours. The reaction mixture is shaken with benzene. The benzene layer is washed with aqueous sodium carbonate and then water, and dried. Removing the solvent, the residue is chromatographed on alumina. The substance eluated with petroleum ether benzene (1:1, 1:2) is crystallized from methanol to give 3-oxo-16β-mercapto-17β-hydroxy-4-androstene cyclohexanone 16,17-cyclic acetal (270 mg.) as needles melting at 185 to 187° C. (decomp.).

$[\alpha]_D^{29°} + 37.6° \pm 2°$ (c.=1.123 chloroform)

*Analysis.*—Calcd. for $C_{25}H_{36}O_2S$: C, 74.95; H, 9.06; S, 8.00. Found: C, 74.81; H, 9.10; S, 8.09.

*Example 6*

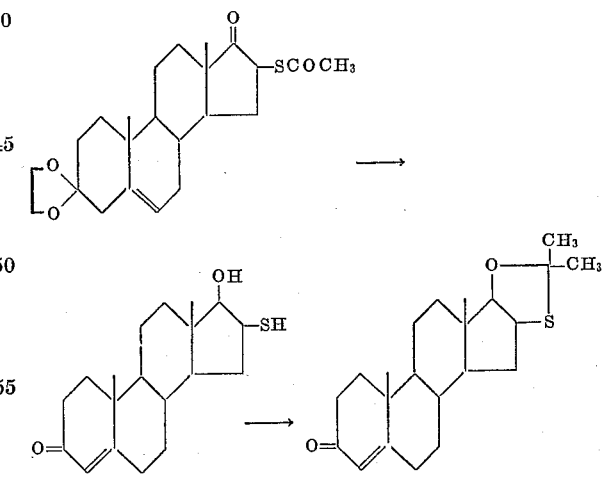

3,3 - ethylenedioxy - 16β-acetylthio-17-oxo-5(6)-androstene (170 mg.) prepared as in Example 2(a) and (b) is reduced with lithium aluminum hydride (80 mg.) as in Example 1(c). The reduction product (160 mg.) is heated with 80% acetic acid (50 ml.) on a water bath for 1 hour and shaken with a mixture of water and ether. The ether layer is washed to neutrality and the solvent is removed to give the residue, which is heated with pyridine and acetic anhydride on a water bath for 1 hour. The resulting product is treated in a conventional manner and chromatographed on alumina. The substance eluated with petroleum ether-benzene (1:1) and benzene is crystallized from acetone-hexane to give 3-oxo-16β-acetylthio-17β-acetoxy-4-androstene (152 mg.) as scales melting at 183 to 184° C.

$[\alpha]_D^{25°} + 68.9° + 2°$ (c.=0.992 chloroform)

*Analysis.*—Calcd. for $C_{23}H_{32}O_4S$: C, 68.28; H, 7.97; S, 7.93. Found: C, 68.01; H, 8.03; S, 7.89.

A solution of 3-oxo-16β-acetylthio-17β-acetoxy-4-androstene (152 mg.) and potassium carbonate (200 mg.) in methanol (5 ml.) and water (1 ml.) is refluxed on a water bath for 2 hours. The reaction mixture is diluted with water and shaken with chloroform. The chloroform layer is washed with water and dried. Removing the solvent, the residue (122 mg.) is chromatographed on activated magnesium silicate. The substance eluated with benzene and benzene-ether (9:1, 4:1) is crystallized from methanol-water to give 3-oxo-16β-mercapto-17β-hydroxy-4-androstene (88 mg.) as small needles melting at 178 to 180° C.

$[\alpha]_D^{21°} + 54.5° \pm 2°$ (c.=1.155 chloroform)

*Analysis.*—Calcd. for $C_{19}H_{28}O_2S$: C, 71.20; H, 8.81; S, 10.01. Found: C, 71.55; H, 9.08; S, 9.91.

3 - oxo - 16β - mercapto-17β-hydroxy-4-androstene is heated with acetone in the presence of p-toluenesulfonic acid to give 3-oxo-16β-mercapto-17β-hydroxy-4-androstene 16,17-acetonide.

*Example 7*

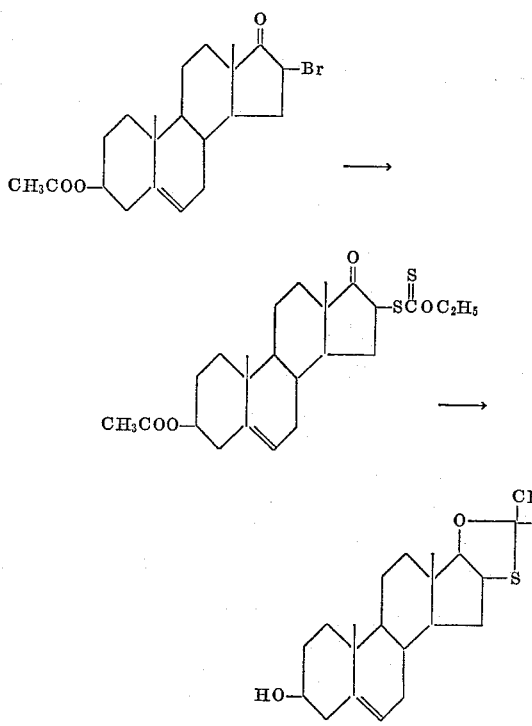

3β-acetoxy-16β-bromo-17-oxo - 5(6) - androstene [B. Ellis et al.: J. Chem. Soc., 800 (1958)] is reacted with potassium ethyldithiocarbonate as in Example 1(b) to give 3β - acetoxy - 16β - ethoxythiocarbonylthio - 17-oxo-5(6)-androstene, which is reduced with lithium aluminum hydride, followed by the condensation with acetone in the presence of p-toluenesulfonic acid as in Example 1(c) and (d) to yield 3β,17β-dihydroxy-16β-mercapto-5(6)-androstene 16,17-acetonide as plates melting at 214 to 216° C.

The thus-prepared 3β,17β - dihydroxy - 16β - mercapto-5(6)-androstene 16,17-acetonide can be converted into 3 - oxo - 16β - mercapto - 17β - hydroxy - 4 - androstene 16,17-acetonide according to a conventional oxidation procedure (e.g. Oppenauer oxidation).

*Example 8*

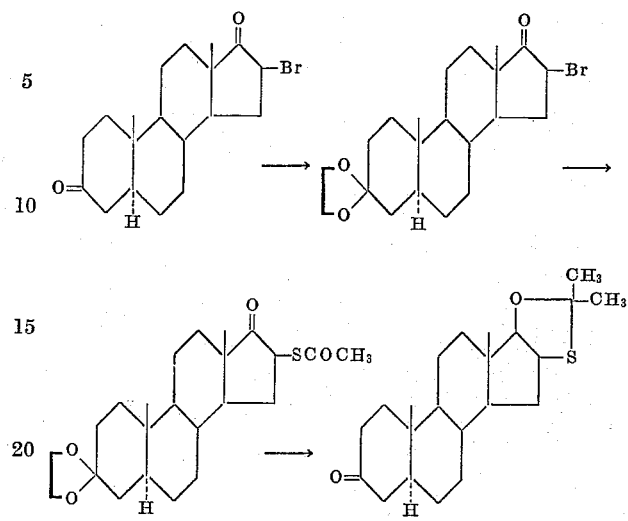

3,17-dioxo-16β-bromo-5α-androstane [J. Fajkoš et al.: Chemical Abstracts, 53, 4349 (1959)] is subjected to ketalation as in Example 1(a). The resulting 3,3-ethylenedioxy-16β-bromo-17-oxo-5α-androstane is reacted with potassium thioacetate as in Example 2(b) to give 3,3 - ethylenedioxy - 16β - acetylthio - 17 - oxo - 5α-androstane and the latter is reduced with lithium aluminum hydride, followed by the reaction with acetone in the presence of p-toluenesulfonic acid as is Example 1(c) and (d) to yield 3-oxo-16β-mercapto-17β-hydroxy-5α-androstane 16,17-acetonide as needles melting at 210 to 212° C.

The thus-prepared 3-oxo-16β-mercapto-17β-hydroxy-5α-androstane 16,17-acetonide shows sodium retaining activity as well as antigonadotropic activity.

*Example 9*

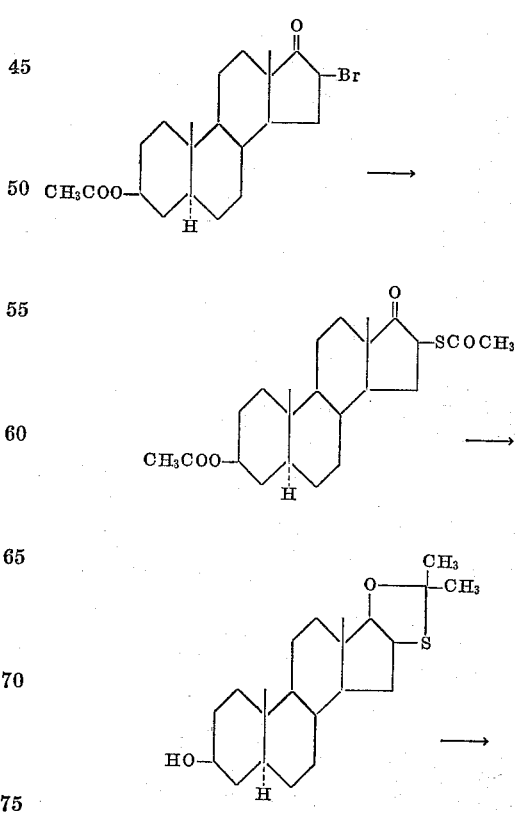

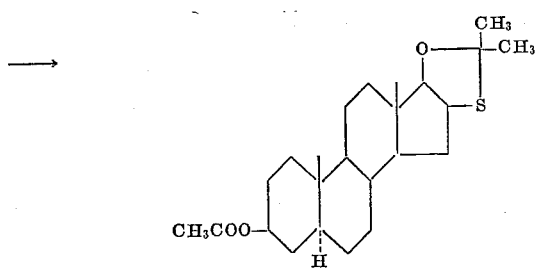

To a suspension of 3β-acetoxy-16β-bromo-17-oxo-5α-androstane [J. Fajkoš et al.: Chemical Abstracts, 53, 4349 (1959)] (3.079 g.) in acetone (50 ml.), there is added potassium thioacetate (1.28 g.), and the resultant mixture is stirred for 3 hours at room temperature (10 to 25° C.). Adding water to the reaction mixture, the precipitate is collected by filtration, dried and crystallized from acetone-methanol to give 3β-acetoxy-16β-acetylthio-17-oxo-5α-androstane (2.57 g.) as needles melting at 145 to 147° C.

*Analysis.*—Calcd. for $C_{23}H_{34}O_4S$: C, 67.94; H, 8.43; S, 7.89. Found: C, 68.05; H. 8.65; S, 7.95.

As in Example 1(c), 3β-acetoxy-16β-acetylthio-17-oxo-5α-androstane is reduced with lithium aluminum hydride and the reduction product is heated with acetone in the presence of p-toluenesulfonic acid to give 3β,17β-dihydroxy-16β-mercapto-5α-androstane 16,17 - acetonide as prisms melting at 196 to 198° C.

*Analysis.*—Calcd. for $C_{22}H_{36}O_2S$: C, 72.47; H, 9.95; S, 8.80. Found: C, 72.17; H, 10.08; S, 8.79.

3β,17β - dihydroxy-16β-mercapto-5α-androstane 16,17-acetonide is heated with pyridine and acetic anhydride to give 3β-acetoxy-16β-mercapto-17β-hydroxy-5α-androstane 16,17-acetonide as scales melting at 173 to 175° C.

*Analysis.*— Calcd. for $C_{24}H_{38}O_3S$: C, 71.13; H, 9.42; S, 7.89. Found: C, 71.03; H, 9.66; S, 8.05.

The above-prepared 3β,17β - dihydroxy - 16β - mercapto-5α-androstane 16,17-acetonide shows lipid-shifting activity as well as antigonadotropic activity.

*Example 10*

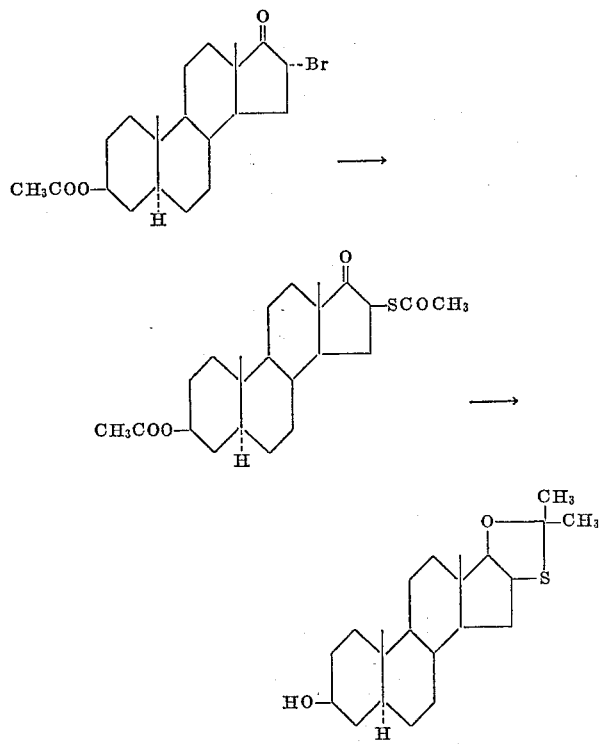

To a suspension of 3β-acetoxy-16α-bromo-17-oxo-5α-androstane [J. Fajkoš et al.: Chemical Abstracts, 53, 4349 (1959)] (624 mg.) in acetone (20 ml.), there is added potassium thioacetate (260 mg.), and the resultant mixture is stirred for 3 hours at room temperature (10 to 25° C.). Adding water to the reaction mixture, the precipitate is collected by filtration, dried and crystallized from methanol to give 3β-acetoxy-16β-acetylthio-17-oxo-5α-androstane (541 mg.) as needles melting at 142 to 145° C.

3β-acetoxy-16β-acetylthio- 17 - oxo - 5α - androstane is treated as in Example 9 to give 3β,17β-dihydroxy-16β-mercapto-5α-androstane 16,17-acetonide as prisms melting at 196 to 198° C.

What is claimed is:

1. Process for preparing a steroidal cyclic acetal which comprises reacting a 16-halogeno-17-oxo steroid of androstane series with a member selected from the group consisting of reactive thio(lower)alkanoic acid derivatives and reactive lower alkyldithiocarbonic acid derivatives, reducing the resulting 16β-substituted thio-17-oxo steroid of androstane series with an alkali metal hydride compound and condensing the resultant 16β-mercapto-17β-hydroxy steroid of androstane series with a carbonyl compound selected from the group consisting of aldehydes and ketones in the presence of an acidic catalyst to obtain the 16β-mercapto-17β-hydroxy steroid 16,17-cyclic acetal of androstane series.

2. In a process for the preparation of 16β-mercapto-17β-hydroxyandrostane 16,17-cyclic acetal which includes the step of converting the corresponding 16β-mercapto-17β-hydroxyandrostane into the said 16,17-cyclic acetal, the feature of preparing the said 16β-mercapto-17β-hydroxyandrostane by reacting a 16-halogeno-17-oxoandrostane of the formula:

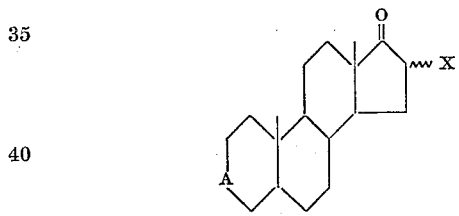

wherein A is a member selected from the group consisting of α-lower alkanoyloxymethylene, β-lower alkanoyloxymethylene and lower alkylenedioxymethylene, X is halogen, a double bond can be present between the 5-position and the 6-position and the ripple mark (∫) represents a configuration selected from the group consisting of α-configuration and β-configuration with a member selected from the group consisting of an alkali metal salt of thio(lower)alkanoic acid and an alkali metal salt of lower alkyldithiocarbonic acid in an inert organic solvent, and treating the resulting 16β-substituted thio-17-oxo-androstane with a reducing agent selected from the group consisting of lithium aluminum hydride, lithium borohydride and sodium borohydride in an inert organic solvent.

3. A process for the preparation of 16β-substituted thio-17-oxoandrostane which comprises reacting a 16-halogeno-17-oxoandrostane of the formula:

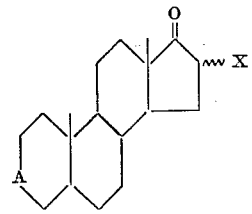

wherein A is a member selected from the group consisting of α-lower alkanoyloxymethylene, β-lower alkanoyloxymethylene and lower alkylenedioxymethylene, X is halogen, a double bond can be present between the 5-position and the 6-position and the ripple mark (∫) represents a configuration selected from the group consisting of α-configuration and β-configuration with a member selected from the group consisting of an alkali metal salt of thio(lower)alkanoic acid and an alkali metal salt of lower alkyldithiocarbonic acid in an inert organic solvent at a room temperature whereby the corresponding 16β-substituted thio-17-oxoandrostane results.

4. A compound of the formula:

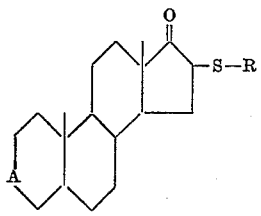

wherein A is a member selected from the group consisting of α-lower alkanoyloxymethylene, β-lower alkanoyloxymethylene and lower alkylenedioxymethylene, and R is a member selected from the group consisting of lower alkanoyl and lower alkoxythiocarbonyl and a double bond can be present between the 5-position and the 6-position.

5. 3,3-lower alkylenedioxy-16β-lower alkoxythiocarbonylthio-17-oxo-5(6)-androstene.

6. 3,3-ethylenedioxy - 16β - ethoxythiocarbonylthio- 17-oxo-5(6)-androstene.

7. 3,3-lower alkylenedioxy-16β-lower alkanoylthio-17-oxo-5(6)-androstene.

8. 3,3-ethylenedioxy-16β-acetylthio-17-oxo-5(6)-androstene.

9. 3β-lower alkanoyloxy-16β-lower alkoxythiocarbonylthio-17-oxo-5(6)-androstene.

10. 3β-acetoxy-16β- ethoxythiocarbonylthio - 17-oxo-5-(6)-androstene.

11. 3,3-lower alkylenedioxy-16β-lower alkanoylthio-17-oxo-5α-androstane.

12. 3,3-ethylenedioxy-16β - acetylthio-17-oxo-5α-androstane.

13. 3β-lower alkanoyloxy-16β-lower alkanoylthio-17-oxo-5α-androstane.

14. 3β-acetoxy-16β-acetylthio-17-oxo-5α-androstane.

15. 3,3-lower alkylenedioxy- 16β - mercapto - 17β - hydroxy-5(6)-androstene.

16. 3,3-ethylenedioxy-16β-mercapto-17β-hydroxy-5(6)-androstene.

17. 3-oxo-16β-lower alkanoylthio-17β-lower alkanoyloxy-4-androstene.

18. 3-oxo-16β-acetylthio-17β-acetoxy-4-androstene.

19. 3-oxo-16β-mercapto-17β-hydoxy-4-androstene.

20. 3-oxo-16β-mercapto-17β- hydroxy - 5α - androstane 16,17-acetonide.

21. 3β,17β-dihydroxy-16β-mercapto-5α-androstane 16,17-acetonide.

22. 3β-lower alkanoyloxy-16β-mercapto-17β-hydroxy-5α-androstane 16,17-acetonide.

23. 3β-acetoxy-16β-mercapto-17β - hydroxy - 5α-androstane 16,17-acetonide.

References Cited in the file of this patent
UNITED STATES PATENTS
3,112,306    Takeda et al. _____ Nov. 26, 1963